No. 689,677.  
Patented Dec. 24, 1901.
H. C. LA FLAMBOY.
MATCH MAKING MACHINE.
(Application filed Apr. 26, 1901.)
(No Model.)  
4 Sheets—Sheet 1.
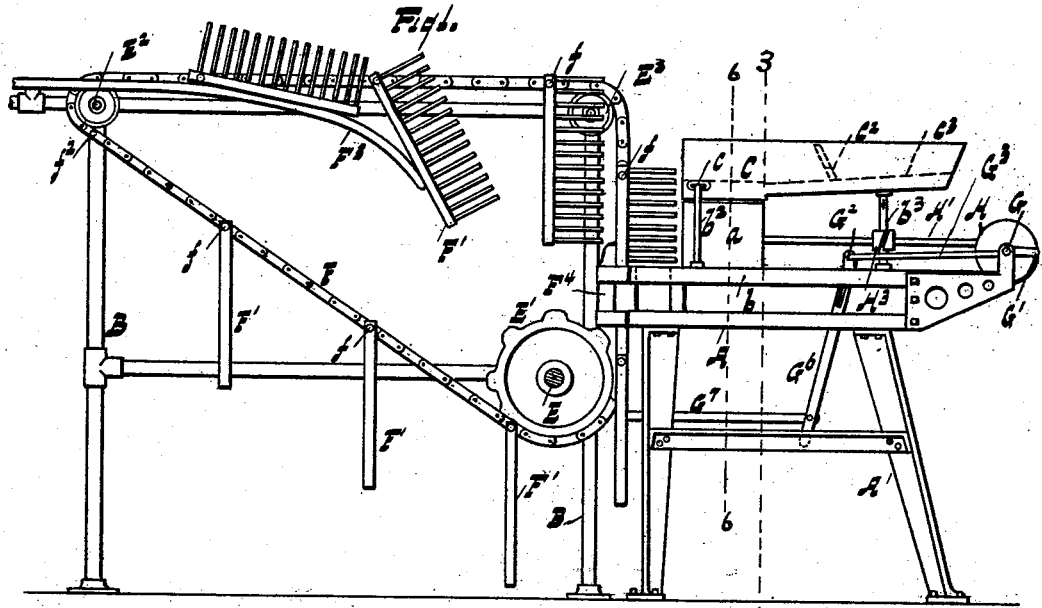
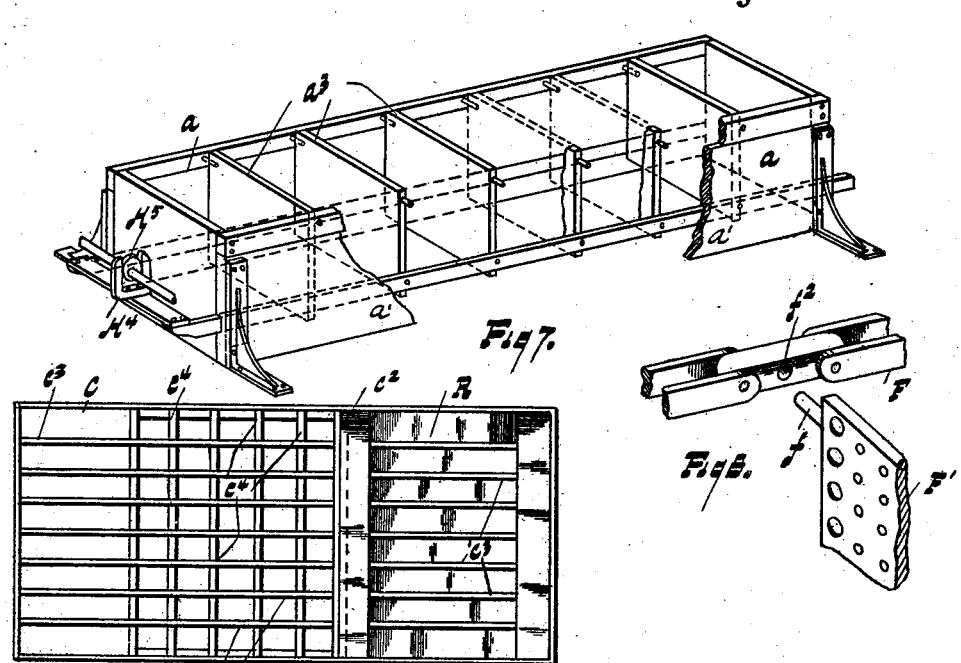
WITNESSES  
T. C. Massey  
Nettie V. Belles
INVENTOR  
Harry C. LaFlamboy  
By Parker & Burton  
Attorneys.
THE NORRIS PETERS CO., PHOTO-LITHO., WASHINGTON, D. C.

No. 689,677. Patented Dec. 24, 1901.
H. C. LA FLAMBOY.
MATCH MAKING MACHINE.
(Application filed Apr. 26, 1901.)
(No Model.) 4 Sheets—Sheet 2.
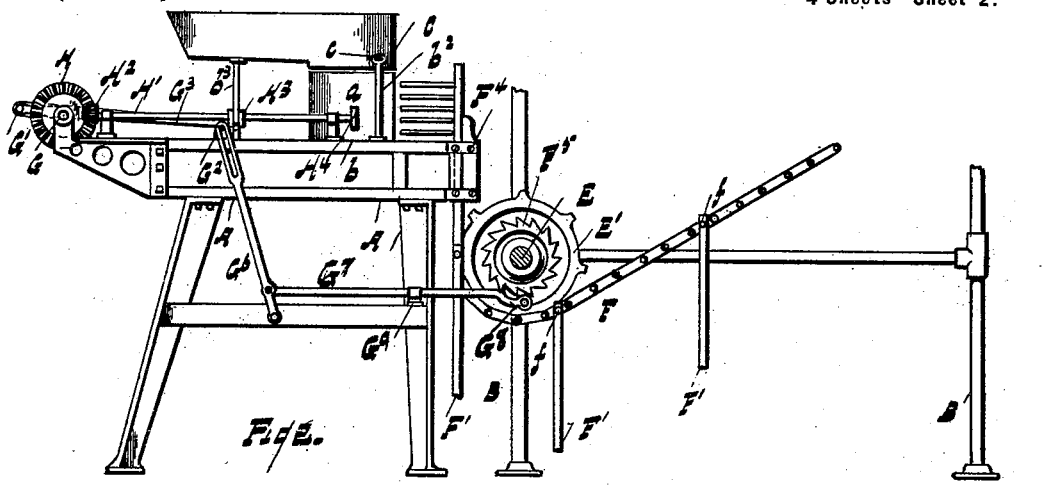
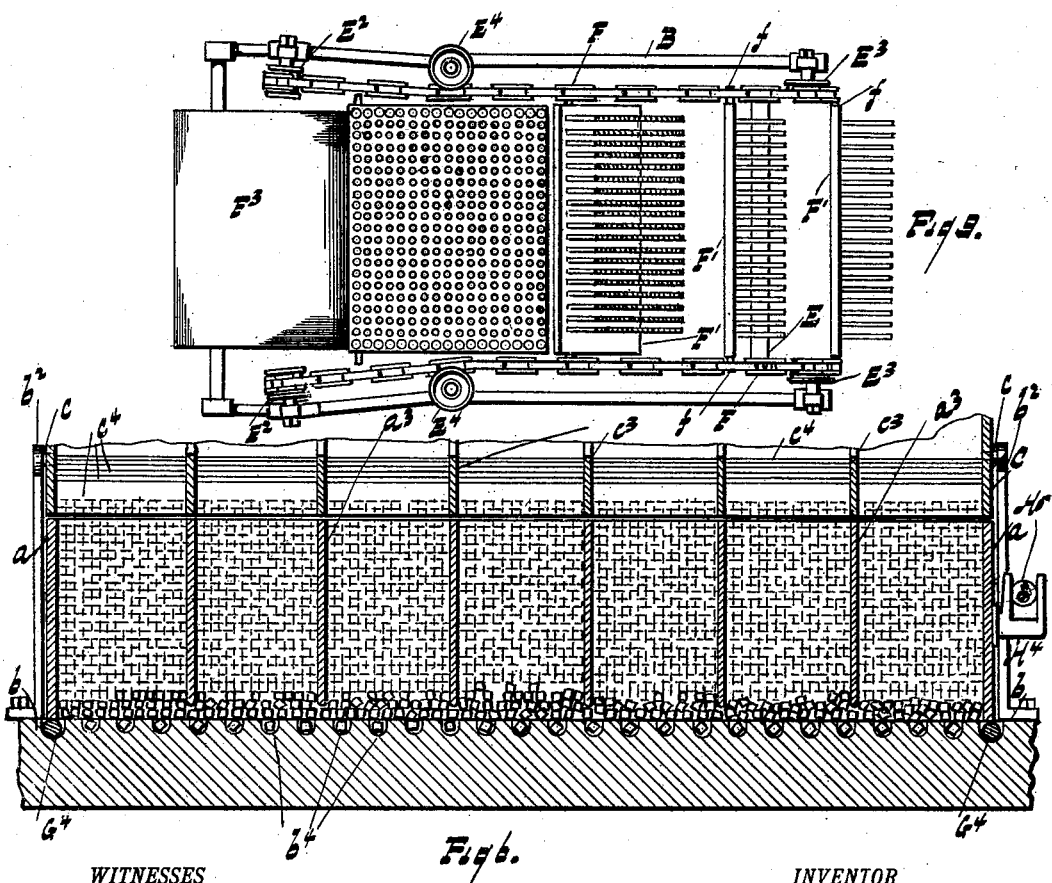
WITNESSES
T. T. Massey
Nettie V. Belles
INVENTOR
Harry C. La Flamboy
By Parker & Burton
Attorneys.

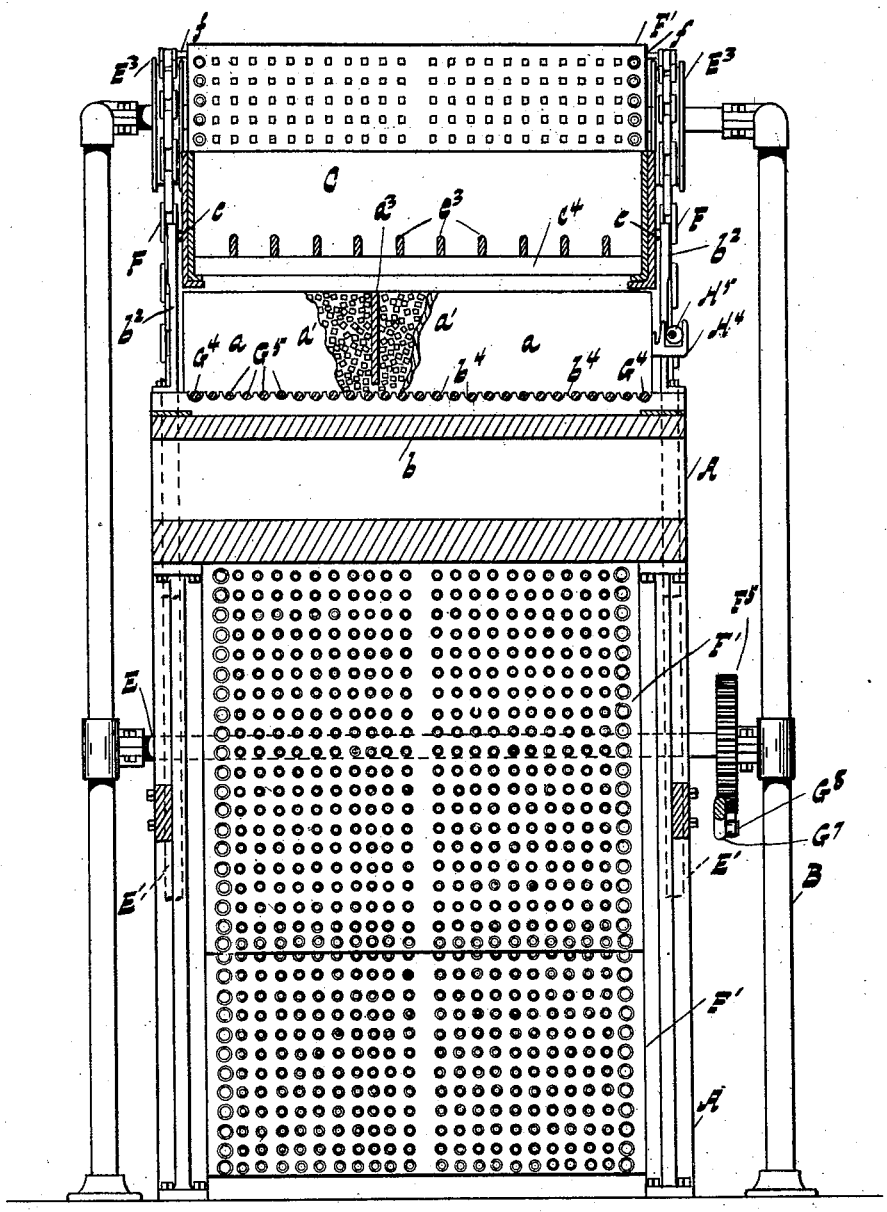

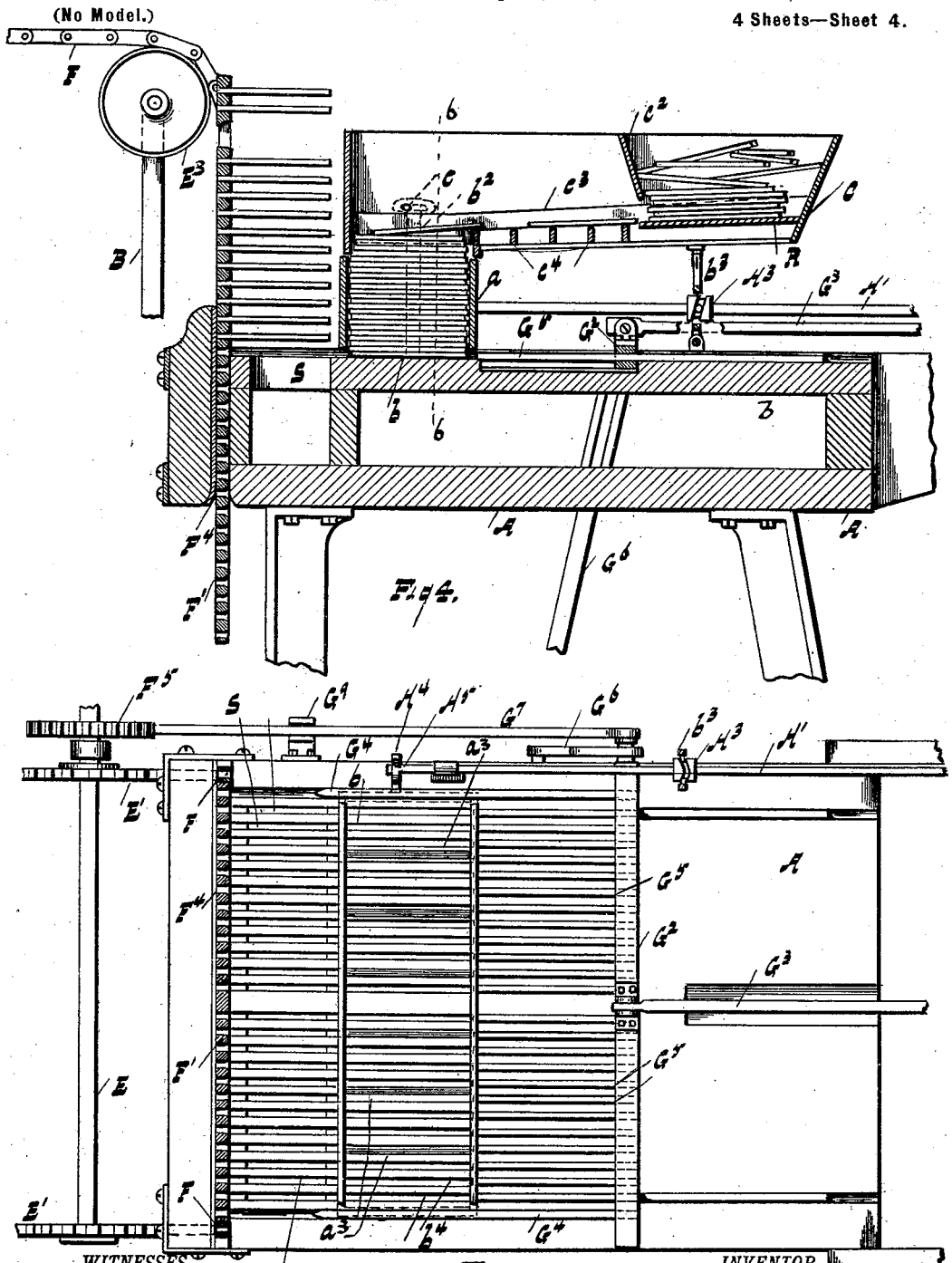

UNITED STATES PATENT OFFICE.

HARRY C. LA FLAMBOY, OF DETROIT, MICHIGAN, ASSIGNOR OF TWO-THIRDS TO ROBERT THUNER AND BETHUNE DUFFIELD, OF DETROIT, MICHIGAN.

MATCH-MAKING MACHINE.

SPECIFICATION forming part of Letters Patent No. 689,677, dated December 24, 1901.

Application filed April 26, 1901. Serial No. 57,564. (No model.)

*To all whom it may concern:*

Be it known that I, HARRY C. LA FLAMBOY, a citizen of the United States, residing at Detroit, county of Wayne, State of Michigan, have invented a certain new and useful Improvement in Match-Making Machines; and I declare the following to be a full, clear, and exact description of the invention, such as will enable others skilled in the art to which it pertains to make and use the same, reference being had to the accompanying drawings, which form a part of this specification.

My invention relates to machines for making matches, and more particularly for making matches the sticks of which are cut from veneers.

Referring to the accompanying drawings, Figure 1 is a side elevation of a machine embodying my invention, the carrying-chain and pulley which are toward the observer being removed. Fig. 2 is a side elevation of the same, showing the opposite side to that shown in Fig. 1. Fig. 3 is a sectional elevation, the section being taken upon the line 3 3 of Fig. 1, a portion of the side of the trough $a$ being broken away at $a'$ $a'$ to show the interior. Fig. 4 is a central sectional detail, to an enlarged scale, of the hopper and parts lying adjacent thereto. Fig. 5 is a plan view of the portion of the machine shown in Fig. 4 with the hopper removed. Fig. 6 is a sectional detail taken on the line 6 6 of Fig. 4. Fig. 7 shows the preferred form of construction of the trough $a$ $a$. Fig. 8 is a detail view illustrating the method of connecting the carrier-plates to the chains. Fig. 9 is a plan view of the plate-carrying mechanism. Fig. 10 is a plan view of the hopper.

A A represent a frame upon which is supported the apparatus and mechanism for placing the sticks in the carrier-plates.

B B represent a framework which supports the plates and mechanism for transporting the same.

C is a hopper, into the outer end of which the match-sticks are placed in an irregular mass.

$a$ is a trough of a width a little greater than the length of a match extending transversely across the frame A, beneath the inner end of the hopper C, and resting upon a bed $b$, located upon the upper part of said frame toward the inner end thereof. Said hopper is supported at its inner end by a pin $c$, extending laterally from each side thereof and projecting into a horizontal slot in the upper part of a standard $b^2$, extending from the bed $b$. The outer end of the hopper C is supported upon a vertical swinging link $b^3$, pivoted at its lower end to the bed $b$ and at its upper end to the hopper.

$C^3$ represents longitudinal ribs in the hopper C, extending in vertical planes parallel to each other and a distance apart less than the length of a match.

$C^2$ is a partition extending across the hopper C about midway of its length and from the top of the rib $C^3$ to the top of the hopper. The bottom of the hopper is closed between the outer end of said hopper and a line beneath the lower edge of the partition $C^2$ by a bottom H, secured against the lower edges of the ribs $C^3$. The rest of the bottom of the hopper C is open except for the vertically-extending ribs.

$C^4$ represents ribs lying parallel to each other in vertical planes a distance apart a little less than half the length of a match and extending transversely across the hopper C, between a line directly beneath the lower edge of the partition $C^2$, to the trough $a$. The upper edges of the ribs $C^4$ are in line with the bottom R, and form therewith an incline down which the matches slide, as hereinafter described. The trough $a$ is without a bottom and is divided by transverse partitions $a^3$, lying parallel to each other in vertical planes a distance apart equal to the distance between the ribs $C^3$, and each of said partitions comes directly beneath one of said ribs. In the preferred form of said trough, Fig. 7, the ends and partitions are pivoted toward their upper edges and oscillate slightly about their pivots. The partitions are so connected together that a movement of one will be communicated to the others. In the other form of the trough $a$ the partitions are stationary in the trough and the entire trough is given a slight reciprocating motion. In either case the ends and sides of the trough come flush with the bed $b$ at their lower edges, and the lower edges of the partitions are above the bed a distance equal to about one and a half times the thickness of the match. In the bed $b$, at its upper surface, are formed grooves $b^4$, (see Fig. 6,) which extend parallel to each other to the inner edge of said bed. Each of said grooves is just large enough to admit a single match-stick.

S in Figs. 4 and 5 represents slots through the bed $b$ in line with the grooves $b^4$ between the trough $a$ and the inner end of the frame A. The frame B has its inner end adjacent to the inner end of the frame A.

E is a shaft-bearing in the frame B at the inner end of said frame and lower than the bed $b$. E' E' are sprocket-wheels upon the ends of the shaft E, Fig. 5. $E^2$ $E^2$ are pulleys on the upper and outer part of the frame B, one upon each side thereof.

$E^3$ $E^3$ are pulleys upon the upper and inner part of the frame B, one upon each side thereof.

F F are sprocket-chains passing over the sprocket-wheels E' E' and over the pulleys $E^3$ $E^3$ and $E^2$ $E^2$. Said chains extend vertically between the wheels E' E' and the pulleys $E^3$ $E^3$ horizontally to the pulleys $E^2$ $E^2$, from whence they return directly to the wheels E' E'. The pulleys $E^2$ $E^2$ are located a greater distance apart than the pulleys $E^3$ $E^3$. (See Fig. 9.)

$E^4$ $E^4$ are pulleys turning upon vertical arbors which rise from the frame B. The pulleys $E^4$ $E^4$ are so located that they guide the parts of the chain F F parallel to each other between themselves and the pulleys $E^3$ $E^3$, as shown in Fig. 9. From the pulleys $E^4$ $E^4$ the chains F F diverge to the pulleys $E^2$ $E^2$.

F' indicates foraminous plates having lateral pivot-pins $f$ entending from their ends, near one side. The holes in the plate F' are arranged in horizontal lines and are each of a size to receive a match-stick and hold it tightly, except the two end holes in each row, which are larger.

$f^2$, Fig. 8, indicates holes in the links of the chains F F, adapted to receive the pivot-pins $f$. The plates F' F' are secured to the chains F F by placing the pins $f$ in the holes $f^2$.

$F^3$ is a table secured to the outer and upper part of the frame B between the upper horizontal portions of the chains F F and having its inner end bent downward, as shown in Fig. 1.

$F^4$ is a guide through which the chains F and the plates F' slide while passing the inner end of the table $b$.

$F^5$, Fig. 2, is a ratchet-wheel upon the shaft E, having teeth located a distance apart that corresponds to a movement of the chains F and plates F' equal to the distance between the lines of perforations in said plates.

G, Fig. 1, is the shaft upon the upper and outer portion of the frame A, through which motion is communicated to the mechanism by a belt and pulley or otherwise.

G' is a crank upon the shaft G.

$G^2$ is a cross-head adapted to reciprocate in ways upon the bed $b$.

$G^3$ is a connecting-rod extending from the cross-head $G^2$ to the wrist-pin on the end of the crank G'.

$G^4$ represents rods each of which is secured at one end to an end of the cross-head $G^2$, is sharpened at the other end, and adapted to enter a hole at the end of a row of holes in the plates F' when the cross-head $G^2$ is at the inner end of its stroke. The rods $G^4$ reciprocate in grooves in the bed $b$ and serve to accurately adjust the position of the plates F'.

$G^5$ designates a series of rods, each of which is secured at one end to the cross-head $G^2$ and reciprocates in one of the grooves $b^4$ in line with one of the holes in the plates F'.

$G^6$ is a swinging arm pivoted to the frame A beneath the bed $b$ and provided with a slot in its upper end which engages over a pin on the cross-head G, so that the reciprocation of said cross-head oscillates said arm.

$G^7$, Fig. 2, is a pitman pivoted at one end to the arm $G^6$, bearing in a guide $G^9$ upon the frame A and carrying a pawl $G^8$ at the free end, which pawl is adapted to engage the teeth of the wheel $F^5$, so as to turn said wheel one tooth at each oscillation of the arm $G^6$.

H, Fig. 2, is a bevel gear-wheel upon the shaft G.

H' is a shaft resting in bearings upon the frame A at the top and at one side thereof and extending parallel to said edge.

$H^2$ is a small bevel gear-wheel upon the shaft H', the teeth of which mesh with the teeth of the wheel H.

$H^3$ is a cylinder keyed upon the shaft H' and provided with a cam-groove in its periphery within which extends pins from the arm $b^3$. The rotation of the cylinder $H^3$ with the shaft H' oscillates the arm $b^3$ and reciprocates the hopper C rapidly in the direction of its length.

$H^4$ is a fork secured to the end of the trough $a$ or to the end partition when the partitions are movable.

$H^5$ is a cam upon the shaft H', which engages in the fork $H^4$, so that the rotation of said shaft oscillates the trough $a$ or the partitions therein rapidly in a direction transverse to the bed $b$.

The operation of the above-described device is as follows: The match-sticks, which may be square in cross-section, are thrown into the hopper C at its outer end. They are shaken by the movement of the hopper until they fall between the ribs $C^3$. As the distance between said ribs is much less than the length of a match-stick, said sticks drop down upon the bottom of the hopper with their lengths approximately parallel to said ribs. They then slide beneath the partition $G^2$ and over the upper edges of the ribs $C^4$ until they fall into the trough $a$ with their lengths transverse to said trough. If there are any short pieces of match-sticks, they will fall between the ribs C⁴. The oscillation of the trough $a$ arranges all the match-sticks therein accurately parallel to each other at right angles to the length of said trough and parallel to the grooves $b^4$. From the trough $a$ the sticks fall into the grooves $b^4$, one into each groove. The foraminous plates F' are placed upon the chains F, as above described, one of said plates being in the guides F⁴, with its upper line of perforations in line with the grooves $b^4$. As the shaft G rotates the cross-head G² is driven forward, the rods G⁴ entering the holes in the plate F' and fixing said plate accurately in position. The rods G⁵ then contact the ends of the matches in the grooves $b^4$, pressing them forward and into the holes in the plate F'. If there are any broken matches, they will pass through the slots S. As the cross-head G² moves forward it carries with it the swinging arm G⁶, which moves the pitman G⁷ and carries the pawl G⁸ over and somewhat beyond the next succeeding tooth of the ratchet-wheel F. On the return stroke of the cross-head G² the rods G⁴ are first withdrawn from the holes in the plate F'. The pawl G⁸ then contacts a tooth of the wheel F⁵ and turns said wheel a definite distance, which turns the sprocket-wheels E', carrying the chains and the plates on them along and raising the plate in the guide F⁴ until the next succeeding row of holes comes in front of the grooves $b^4$. The above-described operation is then repeated. When one of the plates F' is filled with match-sticks, it is carried above the bed $b$, and the next plate, which is properly located on the chains F for that purpose, follows with its first line of holes in position to be filled with match-sticks. The plates when left free swing by their weight into a vertical position, as indicated in Fig. 1, and enter edgewise into the vertical guides F⁴, the separate plates having their adjacent edges close together. As the plates F' are carried across the top of the frame B they come into contact with the table and are turned upon said table with the protruding sticks upward. As said plates are carried beyond the pulleys E⁴ the chains are removed from the pivot-pins $f$, leaving the plates free to be removed by an attendant. When a filled plate is removed, an empty plate is substituted for it by an attendant inserting the pintles $f$ into the holes $f^2$ in the links of the chains F, and the operation is continuous.

I claim—

1. In a machine for the purpose described, the combination of a trough open at the bottom, a bed provided with a groove for the reception of a match-stick, a partition in said trough pivoted toward its upper edge to the sides of said trough, and means for oscillating said partition in a direction lateral to said groove, substantially as described.

2. In a machine for the purposes described, a traveling chain, a plate for the reception of match-sticks, a guide for said plate during a part of its travel, means for pivoting said plate to said chain arranged to turn said plate about its pivotal point to the proper position to engage said guide, substantially as described.

3. In a machine for the purpose described, a traveling chain, a portion of which extends vertically, a plate for the reception of match-sticks, a guide for fixing the position of said plate at a portion of its vertical travel, and means for pivoting said plate to said chain eccentrically of said plate whereby the weight of said plate causes it to turn to a proper position to engage said guide, substantially as described.

4. In a machine for the purpose described, the combination of a traveling chain, a plate for the reception of match-sticks detachably pivoted to said chain, means for inserting the match-sticks into said plate while said plate is upon said chain, a table so located that said chain shall pass over and upon it, means for turning said plates about their pivots as they pass upon said table, so that said plates shall lie flat in proper position upon said table, and means for automatically separating the chain and plate upon said table.

5. In a machine for the purpose described, the combination of a pair of traveling parallel chains, a plate for the reception of match-sticks, means for detachably securing said plate between said chains, means for filling said plate with match-sticks while attached to said chains, a table so located that said chains shall pass along its upper surface, and means for changing the direction of motion of said chains so that they shall diverge from each other and separate from the plate upon said table.

6. In a machine for the purpose described, the combination of a traveling chain, a plate for the reception of match-sticks detachably pivoted to said chain, means for inserting the match-sticks into said plate while said plate is upon said chain, a table so located that said chain shall pass over and upon it, and means for turning said plates about their pivots as they pass upon said table, so that said plates shall lie flat in proper position upon said table.

7. In a machine for the purpose described, a traveling chain extending for a part of its course in an approximately horizontal line, a plate for the reception of match-sticks detachably pivoted to said chain so that its weight shall tend to hold it in a vertical position, a table located in the horizontal line of travel of said chain, said table being inclined downward so as to contact said plate at a point below its center, substantially as and for the purpose described.

8. In a machine for the purpose described, the combination of a bed having grooves therein, each groove being adapted to receive a single match-stick, a trough adapted to receive match-sticks, said trough being open at the bottom and lying on said bed above said grooves, means for reciprocating the matches in said trough transversely to said grooves, a foraminous plate located with a series of holes in line with said grooves, a series of rods adapted to be reciprocated in said grooves to contact and force the match-sticks from said grooves into said holes, and means for reciprocating said rods, substantially as described.

In testimony whereof I sign this specification in the presence of two witnesses.

HARRY C. LA FLAMBOY.

Witnesses:
R. D. PARKER,
LOTTA L. HAYTON.